US012633557B2

(12) United States Patent
Inoue et al.

(10) Patent No.: US 12,633,557 B2
(45) Date of Patent: May 19, 2026

(54) FUEL CELL SYSTEM AND VALVE CONTROL METHOD FOR FUEL CELL SYSTEM

(71) Applicant: HONDA MOTOR CO., LTD., Tokyo (JP)

(72) Inventors: Kazuhide Inoue, Wako (JP); Kazusa Koga, Wako (JP); Takuto Nakagawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 516 days.

(21) Appl. No.: 18/112,543

(22) Filed: Feb. 22, 2023

(65) Prior Publication Data

US 2023/0290980 A1 Sep. 14, 2023

(30) Foreign Application Priority Data

Mar. 11, 2022 (JP) ................................. 2022-037662

(51) Int. Cl.
H01M 8/04992 (2016.01)
H01M 8/04089 (2016.01)
(Continued)

(52) U.S. Cl.
CPC ... H01M 8/04992 (2013.01); H01M 8/04097 (2013.01); H01M 8/0432 (2013.01); H01M 8/04447 (2013.01); H01M 8/04753 (2013.01)

(58) Field of Classification Search
CPC ....... H01M 2008/1095; H01M 8/0258; H01M 8/04089; H01M 8/04097; H01M 8/04231;
(Continued)

(56) References Cited

U.S. PATENT DOCUMENTS

2012/0189925 A1 7/2012 Matsusue
2013/0089797 A1* 4/2013 Falta ................. H01M 8/04231
429/414
(Continued)

FOREIGN PATENT DOCUMENTS

CN 104160542 A 11/2014
DE 10 2012 218 132 A1 4/2013
(Continued)

OTHER PUBLICATIONS

Office Action dated Oct. 1, 2025 issued in the corresponding Japanese Patent Application No. 2022-037662 with the English machine translation thereof.
(Continued)

*Primary Examiner* — Victoria H Lynch
(74) *Attorney, Agent, or Firm* — Carrier, Shende & Associates P.C.; Joseph P. Carrier; Fulchand P. Shende

(57) ABSTRACT

A control unit of a fuel cell system measures or estimates an amount of nitrogen in an anode flow field, performs a first comparison by comparing the amount of nitrogen with the first threshold amount, performs a second comparison by comparing a differential pressure calculated by subtracting a cathode pressure value indicating a pressure inside a cathode flow field from an anode pressure value indicating a pressure inside the anode flow field with the second threshold pressure when the amount of nitrogen in the anode flow field is greater than the first threshold amount in the first comparison, and controls opening and closing of a valve based on the result of the first comparison and the result of the second comparison.

3 Claims, 2 Drawing Sheets

(51) Int. Cl.
  _H01M 8/0432_ (2016.01)
  _H01M 8/0444_ (2016.01)
  _H01M 8/04746_ (2016.01)

(58) Field of Classification Search
  CPC .......... H01M 8/0432; H01M 8/04388; H01M 8/04402; H01M 8/04447; H01M 8/04753; H01M 8/04761; H01M 8/04992; Y02E 60/50
  See application file for complete search history.

(56) References Cited

U.S. PATENT DOCUMENTS

| | | | |
|---|---|---|---|
| 2013/0149627 A1* | 6/2013 | Nishimura | ........ H01M 8/04228 |
| | | | 429/444 |
| 2015/0030948 A1 | 1/2015 | Ikezoe et al. | |

| | | | |
|---|---|---|---|
| 2015/0044582 A1 | 2/2015 | Chikugo et al. | |
| 2018/0145351 A1* | 5/2018 | Wang | ................ H01M 8/04559 |
| 2019/0379074 A1 | 12/2019 | Sinha et al. | |

FOREIGN PATENT DOCUMENTS

| | | |
|---|---|---|
| JP | 2005-174757 A | 6/2005 |
| JP | 2007-035436 A | 2/2007 |
| JP | 2009-277502 A | 11/2009 |
| JP | 2015-056387 A | 3/2015 |
| WO | 2011/024581 A1 | 3/2011 |

OTHER PUBLICATIONS

Office Action and Search Report dated Mar. 26, 2026 issued in the corresponding Chinese Patent Application No. 202310193327.4 with the English machine translation thereof.

* cited by examiner

FUEL CELL SYSTEM AND VALVE CONTROL METHOD FOR FUEL CELL SYSTEM

CROSS-REFERENCE TO RELATED APPLICATIONS

This application is based upon and claims the benefit of priority from Japanese Patent Application No. 2022-037662 filed on Mar. 11, 2022, the contents of which are incorporated herein by reference.

BACKGROUND OF THE INVENTION

Field of the Invention

The present invention relates to a fuel cell system for preventing a decrease in hydrogen concentration in an anode flow field and a valve control method for the fuel cell system.

Description of the Related Art

In recent years, research and development have been conducted on fuel cells that contribute to energy efficiency in order to ensure that more people have access to affordable, reliable, sustainable and modern energy.

JP 2007-035436 A discloses a fuel cell system mounted on a fuel cell vehicle. Hereinafter, this fuel cell system is also referred to as a first system. In the first system, the anode gas is supplied from the anode supply flow path to the anode flow field inside the fuel cell stack. The main component of the anode gas is hydrogen. In the first system, the cathode gas is supplied from the cathode supply flow path to the cathode flow field inside the fuel cell stack. The cathode gas is air (oxygen, nitrogen, etc.). The fuel cell stack generates electricity by reactions between hydrogen in the anode gas and oxygen in the cathode gas. An anode off-gas (hydrogen, nitrogen, moisture, etc.) is discharged from the anode flow field. The anode off-gas is supplied to a gas-liquid separator. The gas-liquid separator separates the anode off-gas into a gas (hydrogen, nitrogen, etc.) and a liquid (water).

The anode off-gas discharged from the gas-liquid separator may be supplied to the anode supply flow path via a circulation flow path. Alternatively, the anode off-gas flowing from the gas-liquid separator may be discharged to the outside of the fuel cell system via a purge flow path and a diluter. Further, the anode off-gas flowing from the gas-liquid separator may be discharged together with water to the outside of the fuel cell system via a drain channel and the diluter.

Currently, new fuel cell systems are being developed. Hereinafter, the currently developed fuel cell system is also referred to as a second system. In the second system, a connection flow path is provided instead of the purge flow path of the first system. The connection flow path branches off from a circulation flow path and is connected to the cathode supply flow path. That is, in the second system, the anode off-gas flowing from the gas-liquid separator may be supplied not only to the anode supply flow path but also to the cathode supply flow path. Hydrogen in the anode off-gas is consumed in reactions with oxygen on the catalyst of the cathode of the fuel cell stack. Therefore, in the second system, the amount of hydrogen discharged from the anode system to the outside decreases, and accordingly, the amount of air required for diluting the hydrogen in the diluter also decreases. Therefore, according to the second system, the rotation speed of the air pump that supplies air to the diluter can be reduced, and the fuel efficiency is improved compared to the first system.

SUMMARY OF THE INVENTION

In the second system, when the pressure inside the cathode supply flow path is higher than the pressure in the circulation flow path, the cathode gas flows through the connection flow path toward the circulation flow path. Therefore, air is mixed into the anode gas, and the hydrogen concentration in the anode gas is relatively decreased. Then, the power generation of the fuel cell stack becomes unstable. In addition, the anode deteriorates due to hydrogen deficiency.

An object of the present invention is to solve the aforementioned problem.

According to the first aspect of the present invention, there is provided a fuel cell system comprising: a fuel cell stack configured to generate electric power using an anode gas in an anode flow field and a cathode gas in a cathode flow field; an anode supply flow path configured to supply the anode gas to the anode flow field; a cathode supply flow path configured to supply the cathode gas to the cathode flow field; a circulation flow path configured to return an exhaust fluid discharged from the anode flow field to the anode supply flow path; a connection flow path configured to supply the exhaust fluid discharged from the anode flow field to the cathode supply flow path; a valve configured to open and close the connection flow path; a control unit configured to control opening and closing of the valve; and a storage unit configured to store a first threshold amount of nitrogen on a basis of which whether to perform control for reducing nitrogen in the anode flow field is determined and a second threshold pressure on a basis of which opening and closing of each of the valve is determined, wherein the control unit measures or estimates an amount of nitrogen in the anode flow field, performs a first comparison by comparing the first threshold amount with the amount of nitrogen, performs a second comparison by comparing the second threshold pressure with a differential pressure calculated by subtracting a cathode pressure value indicating a pressure inside the cathode flow field from an anode pressure value indicating a pressure inside the anode flow field in a case where the amount of nitrogen in the anode flow field is greater than the first threshold amount in the first comparison, and controls opening and closing of the valve based on a result of the first comparison and a result of the second comparison.

According to the second aspect of the present invention, there is provided a valve control method for a fuel cell system, the fuel cell system comprising: a fuel cell stack configured to generate electric power using an anode gas in an anode flow field and a cathode gas in a cathode flow field; an anode supply flow path configured to supply the anode gas to the anode flow field; a cathode supply flow path configured to supply the cathode gas to the cathode flow field; a circulation flow path configured to return an exhaust fluid discharged from the anode flow field to the anode supply flow path; a connection flow path configured to supply the exhaust fluid discharged from the anode flow field to the cathode supply flow path; a valve configured to open and close the connection flow path; and a computer configured to control opening and closing of the valve, the valve control method comprising causing the computer to store a first threshold amount of nitrogen on a basis of which whether to perform control for reducing nitrogen in the anode flow field is determined and a second threshold pressure on a basis of which opening and closing of the valve is determined, measure or estimate an amount of nitrogen in the anode flow field, perform a first comparison by comparing the first threshold amount with the amount of nitrogen, perform a second comparison by comparing the second threshold pressure with a differential pressure calculated by subtracting a cathode pressure value indicating a pressure inside the cathode flow field from an anode pressure value indicating a pressure inside the anode flow field with in a case where the amount of nitrogen in the anode flow field is greater than the first threshold amount in the first comparison, and control opening and closing of the valve based on a result of the first comparison and a result of the second comparison.

According to the present invention, the opening and closing of the valve are performed at appropriate timings by performing the first comparison and the second comparison. According to the present invention, because the cathode gas is prevented from flowing through the connection flow path, and because a decrease in the hydrogen concentration due to mixing of air into the anode gas is eliminated, the power generation of the fuel cell stack is stable. Further, according to the embodiment, it is possible to prevent deterioration of the anode due to hydrogen deficiency. The present invention thus contributes to energy efficiency.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE INVENTION

1. Configuration of Fuel Cell System 10

Figure 1:
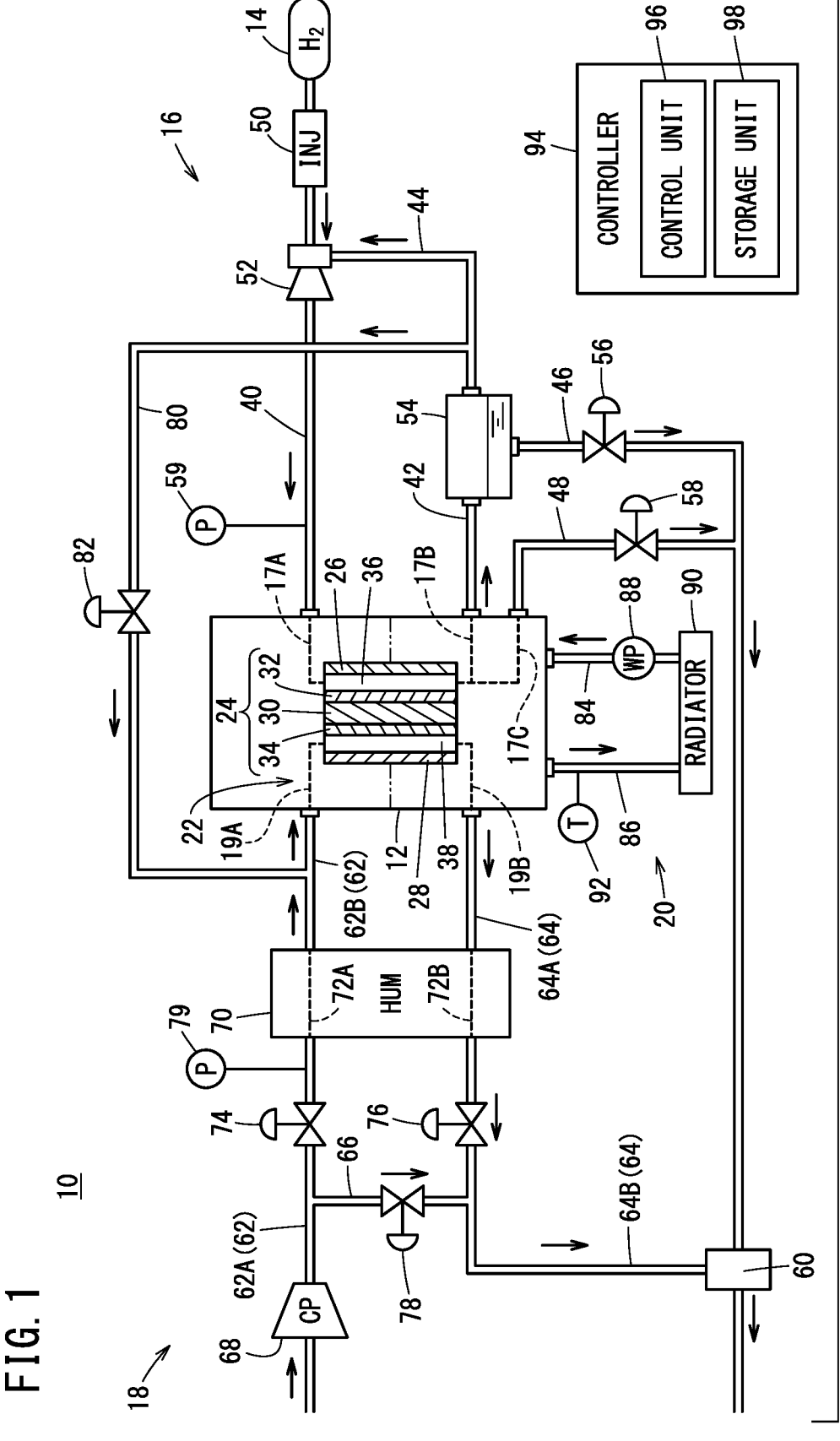
FIG. 1 is a schematic diagram of a fuel cell system according to an embodiment.

FIG. 1 is a schematic diagram illustrating a fuel cell system 10 according to the present invention. The fuel cell system 10 may be mounted on a vehicle (fuel cell automobile). Apart from a vehicle, the fuel cell system 10 can be mounted on, for example, a ship, an aircraft, a robot, or the like. The fuel cell system 10 includes a fuel cell stack 12, a hydrogen tank 14, an anode system 16, a cathode system 18, and a cooling system 20. The fuel cell system 10 includes a controller 94. The output (electric power) of the fuel cell stack 12 is supplied to a load (not shown) such as a motor.

The fuel cell stack 12 has a plurality of power generation cells 22 stacked along one direction. Each of the power generation cells 22 includes a membrane electrode assembly 24 (simply referred to also as electrode assembly 24), and a pair of separators 26, 28. The pair of separators 26, 28 sandwich the electrode assembly 24.

The electrode assembly 24 includes a solid polymer electrolyte membrane 30 (simply referred to also as electrolyte membrane 30), an anode 32, and a cathode 34. The electrolyte membrane 30 is formed by impregnating a thin membrane of perfluorosulfonic acid with water, for example. The anode 32 and the cathode 34 sandwich the electrolyte membrane 30 therebetween. Each of the anode 32 and the cathode 34 has a gas diffusion layer made from carbon paper or the like. An electrode catalyst layer of a platinum alloy supported on porous carbon particles is coated uniformly on the surface of the gas diffusion layer. The electrode catalyst layer is formed on both surfaces of the electrolyte membrane 30, respectively.

An anode flow field 36 is formed on a surface of the separator 26 facing the electrode assembly 24. The anode flow field 36 is connected to an anode supply flow path 40 via an anode inlet 17A. The anode flow field 36 is connected to an anode discharge flow path 42 via a first anode outlet 17B. The anode flow field 36 is connected to a second drain flow path 48 via a second anode outlet 17C. The second anode outlet 17C is located lower than the first anode outlet 17B. A cathode flow field 38 is formed on a surface of the separator 28 facing the electrode assembly 24. The cathode flow field 38 is connected to a cathode supply flow path 62 via a cathode inlet 19A. The cathode flow field 38 is connected to a cathode discharge flow path 64 via a cathode outlet 19B.

An anode gas (hydrogen) is supplied to the anode 32. At the anode 32, hydrogen ions and electrons are generated from hydrogen molecules by electrode reactions caused by catalyst. The hydrogen ions permeate the electrolyte membrane 30 and move to the cathode 34. The electrons move through a negative electrode terminal (not shown) of the fuel cell stack 12, a load such as a motor, a positive electrode terminal (not shown) of the fuel cell stack 12, and the cathode 34 in the order. At the cathode 34, by action of the catalyst, hydrogen ions and electrons, and oxygen contained in the supplied air are reacted to produce water.

The anode system 16 includes components for supplying the anode gas to the anode 32 and components for discharging a fluid from the anode 32. The anode system 16 includes the anode supply flow path 40, the anode discharge flow path 42, a circulation flow path 44, a first drain flow path 46, and the second drain flow path 48. The anode system 16 also includes an injector 50, an anode pressure sensor 59, an ejector 52, a gas-liquid separator 54, a first drain valve 56, and a second drain valve 58.

The anode supply flow path 40 connects an outlet of the hydrogen tank 14 to the anode inlet 17A. The anode supply flow path 40 is provided with the injector 50, the ejector 52 and the anode pressure sensor 59. The ejector 52 is arranged closer to the anode inlet 17A than the injector 50. The anode pressure sensor 59 is arranged closer to the anode inlet 17A than the ejector 52. The anode pressure sensor 59 detects the pressure in the anode supply flow path 40. The pressure in the anode supply flow path 40 corresponds to the pressure in the anode flow field 36. The anode pressure sensor 59 may be provided in the anode discharge flow path 42 or the circulation flow path 44. A plurality of anode pressure sensors 59 may be provided.

The anode discharge flow path 42 connects the first anode outlet 17B to the inlet of the gas-liquid separator 54. The circulation flow path 44 connects a gas outlet of the gas-liquid separator 54 to the ejector 52. The first drain flow path 46 connects a water outlet of the gas-liquid separator 54 to an inlet of a diluter 60. The first drain flow path 46 is provide with the first drain valve 56. The second drain flow path 48 connects the second anode outlet 17C to the first drain flow path 46 at a portion downstream of the first drain valve 56. The second drain flow path 48 is provide with the second drain valve 58.

The cathode system 18 includes components for supplying the cathode gas to the cathode 34 and components for discharging a fluid from the cathode 34. The cathode system 18 includes the cathode supply flow path 62, the cathode discharge flow path 64, and a bypass flow path 66. The cathode system 18 also includes a compressor 68, a cathode pressure sensor 79, a humidifier 70, a first stop valve 74, a second stop valve 76, and a bypass valve 78.

The cathode supply flow path 62 connects an air intake port (not shown) to the cathode inlet 19A. The cathode supply flow path 62 is provided with the compressor 68, the first stop valve 74, the cathode pressure sensor 79 and a flow path 72A of the humidifier 70. A portion of the cathode supply flow path 62 upstream of the humidifier 70 is referred to as a cathode supply flow path 62A. A portion of the cathode supply flow path 62 downstream of the humidifier 70 is referred to as a cathode supply flow path 62B. The cathode supply flow path 62A is provided with the compressor 68 and the first stop valve 74. The first stop valve 74 is disposed closer to the humidifier 70 than the compressor 68. The cathode pressure sensor 79 is disposed closer to the humidifier 70 than the first stop valve 74. The cathode pressure sensor 79 detects the pressure of the cathode supply flow path 62. The pressure in the cathode supply flow path 62 corresponds to the pressure in the cathode flow field 38. The cathode pressure sensor 79 may be provided in the cathode discharge flow path 64. A plurality of cathode pressure sensors 79 may be provided.

The cathode discharge flow path 64 connects the cathode outlet 19B to the inlet of the diluter 60. The cathode discharge flow path 64 is provided with a flow path 72B of the humidifier 70 and the second stop valve 76. A portion of the cathode discharge flow path 64 upstream of the humidifier 70 is referred to as a cathode discharge flow path 64A. A portion of the cathode supply flow path 62 downstream of the humidifier 70 is referred to as a cathode discharge flow path 64B. The cathode discharge flow path 64B is provided with the second stop valve 76.

The bypass flow path 66 connects the cathode supply flow path 62A to the cathode discharge flow path 64B. For example, the bypass flow path 66 connects a portion of the cathode supply flow path 62A between the compressor 68 and the first stop valve 74 to a portion of the cathode discharge flow path 64B downstream of the second stop valve 76. The bypass flow path 66 is provided with the bypass valve 78.

The anode system 16 and the cathode system 18 are connected by a connection flow path 80. The connection flow path 80 connects the circulation flow path 44 of the anode system 16 to the cathode supply flow path 62B of the cathode system 18. The connection flow path 80 is provided with a bleed valve 82.

The cooling system 20 includes components for supplying the coolant to the fuel cell stack 12, and components for discharging the coolant from the fuel cell stack 12. The cooling system 20 includes a coolant supply flow path 84 and a coolant discharge flow path 86. The cooling system 20 also includes a coolant pump 88, a radiator 90, and a temperature sensor 92.

A coolant flow field (not shown) for cooling the fuel cell stack 12 is formed inside the fuel cell stack 12. The coolant supply flow path 84 connects an outlet of the radiator 90 to an inlet of the coolant flow field. The coolant supply flow path 84 is provided with the coolant pump 88. The coolant discharge flow path 86 connects an outlet of the coolant flow field to an inlet of the radiator 90. The temperature sensor 92 is provided in the coolant discharge flow path 86. The temperature sensor 92 detects the temperature of the coolant discharged from the fuel cell stack 12.

The controller 94 is a computer (for example, an ECU of the vehicle). The controller 94 includes a control unit 96 and a storage unit 98. The control unit 96 includes a processing circuit. The processing circuit may be a processor such as a CPU or the like. The processing circuit may be an integrated circuit such as an ASIC, an FPGA, or the like. The processor is capable of executing various processes by executing programs stored in the storage unit 98. At least a portion from among a plurality of processes may be performed by an electronic circuit including a discrete device.

The control unit 96 controls the operation of the fuel cell system 10. For example, the control unit 96 receives detection signals from various sensors provided in the fuel cell system 10. Based on the detection signals, the control unit 96 outputs control signals for controlling the valves, the injector 50, the compressor 68, the coolant pump 88, and the like. The valves, the injector 50, the compressor 68, the coolant pump 88, and the like operate in response to the control signals.

The storage unit 98 includes a volatile memory and a non-volatile memory. Examples of the volatile memory include a RAM (Random Access Memory) or the like. The volatile memory is used as a working memory of the processor. In the volatile memory, data and the like required for carrying out processing or computations are temporarily stored therein. Examples of the nonvolatile memory include a ROM (Read Only Memory), a flash memory, and the like. Such a non-volatile memory is used as a storage memory. Programs, tables, and maps, and the like are stored in the non-volatile memory. At least part of the storage unit 98 may be provided in the processor, the integrated circuit, etc. as described above.

The nonvolatile memory stores a first threshold amount and a second threshold pressure. The first threshold amount is a threshold value of the amount of nitrogen for determining whether or not to perform control for reducing the amount of nitrogen in the anode flow field 36. Specifically, the first threshold amount is the allowable amount of nitrogen in the anode flow field 36. The second threshold pressure is a threshold value of the pressure value for determining opening and closing of the bleed valve 82. Each of the first threshold amount and the second threshold pressure is preset by a user.

2. Flow of Fluid 2-1 Fluid Flow in Anode System 16

The injector 50 injects the anode gas (hydrogen) in the hydrogen tank 14 toward the downstream side of the anode supply flow path 40. The anode gas injected from the injector 50 flows through the anode supply flow path 40 and is supplied to the anode flow field 36. The anode gas flows through the anode flow field 36 and is discharged from the first anode outlet 17B as an anode off-gas. The anode off-gas contains hydrogen that has not reacted with oxygen, nitrogen that had been contained in the cathode gas and has permeated the electrolyte membrane 30, and water produced by reactions between oxygen and hydrogen.

The anode off-gas flows through the anode discharge flow path 42 and is supplied to the gas-liquid separator 54. The gas-liquid separator 54 separates the anode off-gas into a gas component (anode off-gas) and a liquid component (water). The anode off-gas discharged from the gas-liquid separator 54 flows through the circulation flow path 44 and is supplied to the ejector 52. In the ejector 52, the anode off-gas and the anode gas injected from the injector 50 join together.

The water separated at the gas-liquid separator 54 is temporarily stored at the bottom of the gas-liquid separator 54. In a state where the first drain valve 56 is opened, the water stored in the gas-liquid separator 54 flows through the first drain flow path 46 and is discharged to the diluter 60.

When the first drain valve 56 is opened in a state in which there is no water in the gas-liquid separator 54, the anode off-gas in the gas-liquid separator 54 flows through the first drain flow path 46 and is discharged to the diluter 60.

When the humidity inside the fuel cell stack 12 is high, water is stored at the bottom of the anode flow field 36. When the second drain valve 58 is opened, the water having been stored in the anode flow field 36 flows into the second drain flow path 48 and the first drain flow path 46 and is discharged to the diluter 60. When the second drain valve 58 is opened in a state in which there is no water in the anode flow field 36, the anode off-gas in the anode flow field 36 flows through the second drain flow path 48 and the first drain flow path 46 and is discharged to the diluter 60.

2-2 Fluid Flow in Cathode System 18

The compressor 68 discharges the cathode gas (air) sucked from the outside of the vehicle toward the downstream side of the cathode supply flow path 62. In a state where the first stop valve 74 is opened, the cathode gas discharged from the compressor 68 flows through the cathode supply flow path 62 and is supplied to the cathode flow field 38. The cathode gas flows through the cathode flow field 38 and is discharged from the cathode outlet 19B as a cathode off-gas. The cathode off-gas contains components contained in the air and water generated by the reactions between oxygen and hydrogen.

In a state where the second stop valve 76 is opened, the cathode off-gas flows through the cathode discharge flow path 64 and is discharged to the diluter 60. The cathode off-gas contains water. In the humidifier 70, the water contained in the cathode off-gas is used to humidify the cathode gas.

When the bypass valve 78 is opened, the cathode gas flows through the bypass flow path 66 and the cathode discharge flow path 64 and is discharged to the diluter 60. The bypass flow path 66 is used when the amount of cathode gas supplied to the fuel cell stack 12 is decreased.

2-3 Fluid Flow in Connection Flow Path 80

In the state where the bleed valve 82 is opened, a portion of the anode off-gas flowing through the circulation flow path 44 flows through the connection flow path 80 and is supplied to the cathode supply flow path 62B. However, the bleed valve 82 is opened only when the pressure in the anode flow field 36 is higher than the pressure in the cathode flow field 38.

3. Reason for Opening Bleed Valve 82

The control unit 96 suppresses a decrease in the hydrogen concentration in the anode flow field 36 and maintains the hydrogen concentration at a certain level or more. The following factors (a) and (b) are considered as factors that cause the hydrogen concentration in the anode flow field 36 to decrease.

(a) Hydrogen in the anode flow field 36 is consumed by power generation of the fuel cell stack 12; and (b) Nitrogen contained in the cathode gas permeates through the electrolyte membrane 30 and enters the anode flow field 36, so that the nitrogen concentration in the anode flow field 36 relatively increases.

To deal with the factor (a), the control unit 96 controls the injector 50. As a result, the amount of hydrogen in the anode flow field 36 increases, and the hydrogen concentration in the anode flow field 36 increases. To deal with the factor (b), the control unit 96 opens the second drain valve 58 or the bleed valve 82. As a result, the anode off-gas containing nitrogen is discharged from the anode flow field 36. Hydrogen as an anode gas is appropriately supplied to the anode flow field 36. Therefore, the hydrogen concentration in the anode flow field 36 relatively increases.

Opening the bleed valve 82 is preferable to opening the second drain valve 58 for the following reasons. When the second drain valve 58 is opened, the anode off-gas discharged from the anode flow field 36 flows through the second drain flow path 48 and is directly discharged to the diluter 60. In this case, a large amount of air is required to dilute the hydrogen in the anode off-gas in the diluter 60. Therefore, the power consumption of the compressor 68 increases. On the other hand, when the bleed valve 82 is opened, the anode off-gas discharged from the anode flow field 36 flows through the anode discharge flow path 42, the gas-liquid separator 54, the circulation flow path 44, the connection flow path 80, the cathode supply flow path 62B, the cathode flow field 38, and the cathode discharge flow path 64 in this order, and is discharged to the diluter 60. In this case, hydrogen in the anode off-gas is consumed by catalytic actions inside the fuel cell stack 12. Therefore, a large amount of air is not required to dilute the hydrogen in the anode off-gas in the diluter 60. Therefore, the power consumption of the compressor 68 is suppressed. From the viewpoint of improving fuel efficiency, the anode off-gas is preferably supplied to the cathode supply flow path 62B via the connection flow path 80.

4. Valve Control Process of Bleed Valve 82

Figure 2:
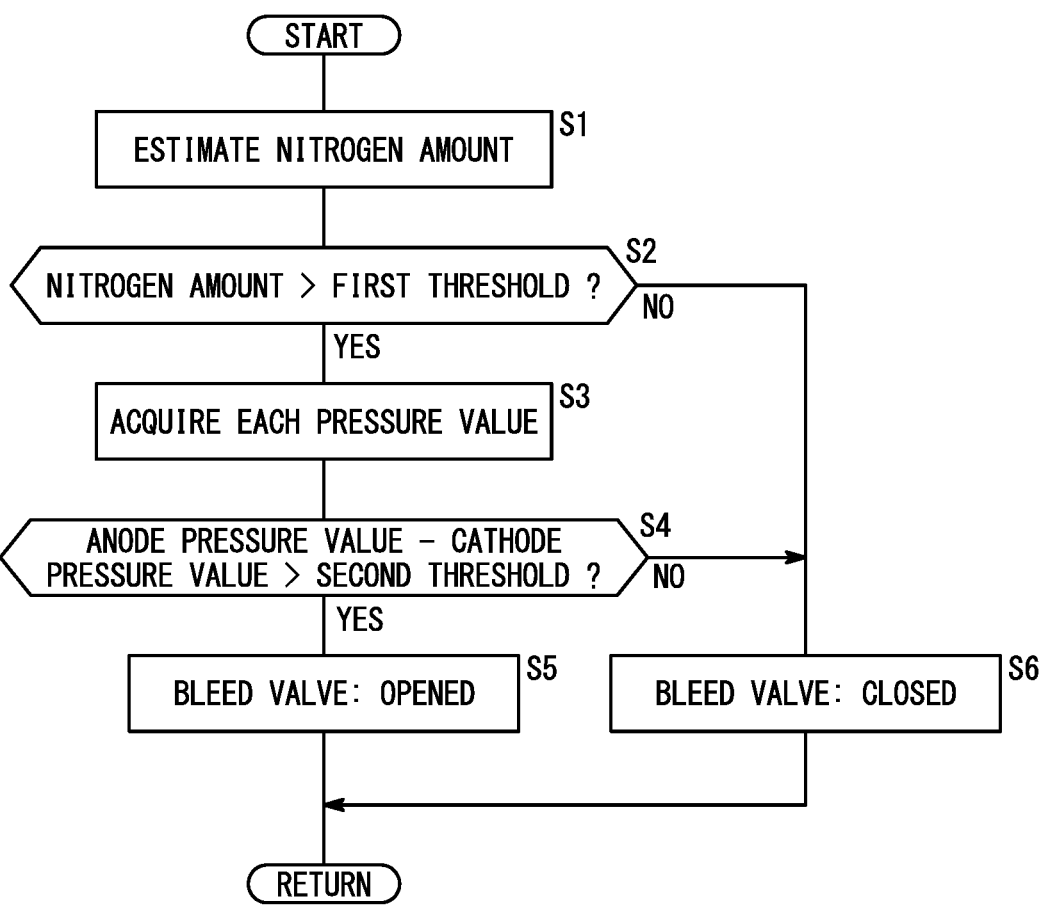
FIG. 2 is a flowchart showing a procedure of valve control processing.

FIG. 2 is a flowchart showing a procedure of valve control processing. The control unit 96 repeatedly performs the valve control process shown in FIG. 2 during the operation of the fuel cell system 10.

In step S1, the control unit 96 estimates the amount of nitrogen in the anode flow field 36. The amount of nitrogen having permeated from the cathode flow field 38 to the anode flow field 36 (amount of nitrogen permeation) can be calculated by multiplying the nitrogen partial pressure difference between the anode flow field 36 and the cathode flow field 38 by the nitrogen permeation coefficient. There is a correlation between the temperature inside the fuel cell stack 12 and the nitrogen permeation coefficient. Further, there is a correlation between the humidity inside the fuel cell stack 12 and the nitrogen permeation coefficient. For example, the control unit 96 controls the components of the fuel cell system 10 so that the humidity inside the fuel cell stack 12 becomes 100%. In this case, the nitrogen permeation coefficient can be estimated based on the temperature inside the fuel cell stack 12. In the present embodiment, the control unit 96 calculates the temperature inside the fuel cell stack 12 based on the temperature of the coolant detected by the temperature sensor 92. Furthermore, the control unit 96 estimates the amount of nitrogen in the anode flow field 36 based on the temperature inside the fuel cell stack 12. The various estimation methods are stored in the storage unit 98. The temperature inside the fuel cell stack 12 can also be calculated from the temperature of the cathode off-gas flowing through the cathode discharge flow path 64 or the temperature of the anode off-gas flowing through the anode discharge flow path 42. The temperature inside the fuel cell stack 12 may be directly detected by a temperature sensor or the like. Instead of estimating the amount of nitrogen, for example, the amount of nitrogen may be directly measured by a sensor or the like provided in the anode discharge flow path 42. Upon completion of step S1, the process transitions to step S2.

In step S2, the control unit 96 determines whether or not it is necessary to discharge nitrogen from the anode flow field 36 based on the estimated (or measured) amount of nitrogen. Specifically, the control unit 96 compares the estimated (or measured) amount of nitrogen with the first threshold amount stored in the storage unit 98 (first comparison). If the amount of nitrogen exceeds the first threshold amount (step S2: YES), the process proceeds to step S3. In this case, the control unit 96 determines that it is necessary to discharge nitrogen from the anode flow field 36. On the other hand, if the amount of nitrogen is equal to or less than the first threshold amount (step S2: NO), the process proceeds to step S6. In this case, the control unit 96 determines that it is not necessary to discharge nitrogen from the anode flow field 36. When the amount nitrogen is equal to the first threshold amount, the process may proceed to step S3.

When the process proceeds from step S2 to step S3, the control unit 96 acquires pressure values. The pressure values include a pressure value (anode pressure value) in the anode flow field 36 and a pressure value (cathode pressure value) in the cathode flow field 38. The control unit 96 utilizes the pressure value acquired from the anode pressure sensor 59 as the anode pressure value. The control unit 96 utilizes the pressure value acquired from the cathode pressure sensor 79 as the cathode pressure value. Upon completion of step S3, the process transitions to step S4.

In step S4, the control unit 96 determines whether to open the bleed valve 82. Specifically, the control unit 96 calculates the differential pressure between the anode pressure and the cathode pressure by subtracting the cathode pressure value from the anode pressure value. The control unit 96 compares the calculated differential pressure with the second threshold pressure stored in the storage unit 98 (second comparison). When the differential pressure exceeds the second threshold pressure (step S4: YES), the process proceeds to step S5. On the other hand, if the differential pressure is equal to or less than the second threshold pressure (step S4: NO), the process proceeds to step S6. When the target power generation amount is equal to the second threshold amount, the process may proceed to step S5.

The second threshold may be zero or a predetermined positive value. When a plurality of anode pressure sensors 59 are provided in the anode system 16, the control unit 96 uses the minimum value among the plurality of sensor values. When a plurality of cathode pressure sensors 79 are provided in the cathode system 18, the control unit 96 uses the maximum value among the plurality of sensor values.

At the time point of transition from step S4 to step S5, the pressure in the anode flow field 36 is higher than the pressure in the cathode flow field 38. When the bleed valve 82 is opened in this state, the anode off-gas flows through the connection flow path 80 from the circulation flow path 44 toward the cathode supply flow path 62. Therefore, the control unit 96 brings the bleed valve 82 into the open state. If the bleed valve 82 is already opened, the control unit 96 keeps the bleed valve 82 opened. On the other hand, if the bleed valve 82 is closed, the control unit 96 opens the bleed valve 82. A part of the anode off-gas discharged from the anode flow field 36 flows through the anode discharge flow path 42, the gas-liquid separator 54, the circulation flow path 44, the connection flow path 80, the cathode supply flow path 62B, the cathode flow field 38, and the cathode discharge flow path 64 in this order, and is discharged to the diluter 60.

At the time of transition from step S2 or step S4 to step S6, the pressure in the anode flow field 36 is lower than the pressure in the cathode flow field 38. When the bleed valve 82 is opened in this state, the cathode gas flows through the connection flow path 80 from the cathode supply flow path

62B toward the circulation flow path 44. Therefore, the control unit 96 brings the bleed valve 82 into a closed state. When the bleed valve 82 is already closed, the control unit 96 keeps the bleed valve 82 closed. On the other hand, if the bleed valve 82 is opened, the control unit 96 closes the bleed valve 82. The anode off-gas flows through the anode discharge flow path 42, the gas-liquid separator 54, the circulation flow path 44, and the ejector 52 in this order, and is returned to the anode supply flow path 40.

5. Invention Obtained from Embodiment

The invention understood from the above embodiment will be described below.

A first embodiment according to the present invention is the fuel cell system (10) comprising: the fuel cell stack (12) configured to generate electric power using the anode gas in the anode flow field (36) and the cathode gas in the cathode flow field (38); the anode supply flow path (40) configured to supply the anode gas to the anode flow field; the cathode supply flow path (62) configured to supply the cathode gas to the cathode flow field; the circulation flow path (44) configured to return the exhaust fluid discharged from the anode flow field to the anode supply flow path; the connection flow path (80) configured to supply the exhaust fluid discharged from the anode flow field to the cathode supply flow path; the valve (82) configured to open and close the connection flow path; and the control unit (96) configured to control opening and closing of the valve. The fuel cell system further includes the storage unit (98) configured to store a first threshold amount of nitrogen on a basis of which whether to perform control for reducing nitrogen in the anode flow field is determined and a second threshold pressure on a basis of which opening and closing of the valve is determined. The control unit measures or estimates an amount of nitrogen in the anode flow field, performs a first comparison by comparing the first threshold amount with the amount of nitrogen, performs a second comparison by comparing a differential pressure calculated by subtracting a cathode pressure value indicating a pressure inside the cathode flow field from an anode pressure value indicating a pressure inside the anode flow field with the second threshold pressure in a case where the amount of nitrogen in the anode flow field is greater than the first threshold amount in the first comparison, and controls opening and closing of the valve based on a result of the first comparison and a result of the second comparison.

In the first embodiment, by performing the first comparison (step S2) and the second comparison (step S4), the opening and closing of the valve (bleed valve 82) is performed at appropriate timing. According to the first embodiment, the cathode gas is prevented from flowing through the connection flow path 80, so that a decrease in the hydrogen concentration due to mixing of air into the anode gas is eliminated. According to the first embodiment, the power generation of the fuel cell stack 12 becomes stable. Further, according to the first embodiment, it is possible to prevent deterioration of the anode 32 due to hydrogen deficiency.

According to the first embodiment, the anode off-gas is appropriately supplied to the cathode supply flow path 62B. A part of hydrogen supplied from the cathode supply flow path 62B to the cathode flow field 38 is consumed by catalytic actions in the fuel cell stack 12. Therefore, the amount of hydrogen to be discharged is reduced and the operation of the compressor 68 is also reduced. Therefore, according to the first embodiment, the fuel efficiency of the fuel cell system 10 is improved. The first embodiment thus contributes to energy efficiency.

In the above embodiment, in the second comparison, the control unit may open the valve when the differential pressure is greater than the second threshold pressure, and close the valve when the differential pressure falls below the second threshold pressure.

In the above embodiment, the control unit may measure or estimate a temperature of the fuel cell stack, and estimate the nitrogen amount based on the temperature of the fuel cell stack.

The second aspect of the present invention is a valve control method for the fuel cell system, the fuel cell system comprising: the fuel cell stack configured to generate electric power using the anode gas in the anode flow field and the cathode gas in the cathode flow field; the anode supply flow path configured to supply the anode gas to the anode flow field; the cathode supply flow path configured to supply the cathode gas to the cathode flow field; the circulation flow path configured to return the exhaust fluid discharged from the anode flow field to the anode supply flow path; the connection flow path configured to supply the exhaust fluid discharged from the anode flow field to the cathode supply flow path; the valve configured to open and close the connection flow path; and the computer configured to control opening and closing of the valve. The valve control method includes causing the computer (94) to store the first threshold amount of nitrogen on the basis of which whether to perform control for reducing nitrogen in the anode flow field is determined and the second threshold pressure on the basis of which opening and closing of the valve is determined, measure or estimate an amount of nitrogen in the anode flow field, perform the first comparison by comparing the first threshold amount with the amount of nitrogen, perform the second comparison by comparing the second threshold pressure with the differential pressure calculated by subtracting the cathode pressure value indicating the pressure inside the cathode flow field from the anode pressure value indicating the pressure inside the anode flow field in the case where the amount of nitrogen in the anode flow field is greater than the first threshold amount in the first comparison, and control opening and closing of the valve based on the result of the first comparison and the result of the second comparison.

The present invention is not limited to the above disclosure, and various modifications are possible without departing from the essence and gist of the present invention.

The invention claimed is:

1. A fuel cell system comprising:
   a fuel cell stack configured to generate electric power using an anode gas in an anode flow field and a cathode gas in a cathode flow field;
   an anode supply flow path configured to supply the anode gas to the anode flow field;
   a cathode supply flow path configured to supply the cathode gas to the cathode flow field;
   a circulation flow path configured to return an exhaust fluid discharged from the anode flow field to the anode supply flow path;
   a connection flow path configured to supply the exhaust fluid discharged from the anode flow field to the cathode supply flow path;
   a valve configured to open and close the connection flow path; and
   a control unit configured to control opening and closing of the valve,
   the fuel cell system further comprising a storage unit configured to store a first threshold amount of nitrogen on a basis of which whether to perform control for reducing nitrogen in the anode flow field is determined and a second threshold pressure on a basis of which opening and closing of the valve is determined,
   wherein the control unit:
      measures or estimates an amount of nitrogen in the anode flow field;
      performs a first comparison by comparing the first threshold amount with the amount of nitrogen;
      performs a second comparison by comparing the second threshold pressure with a differential pressure calculated by subtracting a cathode pressure value indicating a pressure inside the cathode flow field from an anode pressure value indicating a pressure inside the anode flow field in a case where the amount of nitrogen in the anode flow field is greater than the first threshold amount in the first comparison; and
         controls opening and closing of the valve based on a result of the first comparison and a result of the second comparison, and
      the control unit opens the valve in a case where the differential pressure is greater than the second threshold pressure in the second comparison, and closes the valve in a case where the differential pressure is lower than the second threshold pressure.

2. The fuel cell system according to claim 1, wherein the control unit measures or estimates a temperature of the fuel cell stack, and estimates the amount of nitrogen based on the temperature of the fuel cell stack.

3. A valve control method for a fuel cell system, the fuel cell system comprising:
   a fuel cell stack configured to generate electric power using an anode gas in an anode flow field and a cathode gas in a cathode flow field;
   an anode supply flow path configured to supply the anode gas to the anode flow field;
   a cathode supply flow path configured to supply the cathode gas to the cathode flow field;
   a circulation flow path configured to return an exhaust fluid discharged from the anode flow field to the anode supply flow path;
   a connection flow path configured to supply the exhaust fluid discharged from the anode flow field to the cathode supply flow path;
   a valve configured to open and close the connection flow path; and
   a computer configured to control opening and closing of the valve,
   the valve control method comprising
   causing the computer to:
      store a first threshold amount of nitrogen on a basis of which whether to perform control for reducing nitrogen in the anode flow field is determined and a second threshold pressure on a basis of which opening and closing of the valve is determined;
      measure or estimate an amount of nitrogen in the anode flow field;
      perform a first comparison by comparing the first threshold amount with the amount of nitrogen;
      perform a second comparison by comparing the second threshold pressure with a differential pressure calculated by subtracting a cathode pressure value indicating a pressure inside the cathode flow field from an anode pressure value indicating a pressure inside the anode flow field in a case where the amount of nitrogen in the anode flow field is greater than the first threshold amount in the first comparison; and control opening and closing of the valve based on a
result of the first comparison and a result of the
second comparison, and the computer opens the valve in a case where the differential pressure is greater than the second threshold
pressure in the second comparison, and closes the valve
in a case where the differential pressure is lower than
the second threshold pressure.

\* \* \* \* \*